United States Patent [19]

Kankawa et al.

[11] Patent Number: 5,744,532
[45] Date of Patent: Apr. 28, 1998

[54] POWDER INJECTION MOLDING BINDER, POWDER INJECTION MOLDING COMPOSITION AND METHOD FOR PRODUCTION OF SINTERED MEMBER

[75] Inventors: Yoshimitsu Kankawa, Shiga; Toshiki Nikaya, Osaka, both of Japan

[73] Assignee: Nippon Shokubai Co. Ltd., Osaka-fu, Japan

[21] Appl. No.: 406,557

[22] Filed: Mar. 20, 1995

[30] Foreign Application Priority Data

Mar. 23, 1994 [JP] Japan .................. 6-052014
Oct. 20, 1994 [JP] Japan .................. 6-255764

[51] Int. Cl.$^6$ .................. C08K 3/08; C08K 3/10; C08L 31/00
[52] U.S. Cl. .................. 524/440; 524/401; 524/439; 524/559; 524/560; 524/904; 523/139; 525/934
[58] Field of Search .................. 524/440, 401, 524/560, 904, 439; 525/934; 523/200, 139

[56] References Cited

U.S. PATENT DOCUMENTS

| | | | |
|---|---|---|---|
| 3,970,633 | 7/1976 | Miller et al. | 524/904 |
| 4,048,136 | 9/1977 | Kobayashi et al. | 524/440 |
| 4,374,939 | 2/1983 | Fisk, Jr. et al. | 523/139 |
| 4,506,041 | 3/1985 | Tanigawa et al. | 523/139 |
| 5,057,360 | 10/1991 | Osaka et al. | 524/413 |
| 5,147,744 | 9/1992 | Sacripante et al. | 430/39 |

FOREIGN PATENT DOCUMENTS 02101101  10/1988  Japan .

OTHER PUBLICATIONS

CRC Handbook of Chemistry & Physics, 62nd Edition, pp. B203–B207, 1981–1982.

*Primary Examiner*—Tae Yoon
*Attorney, Agent, or Firm*—Omri M. Behr, Esq.

[57] ABSTRACT

An injection molding binder permitting formation of a molded article incapable of sustaining such defects as a crack or an expansion at the degreasing step and allowing the degreasing treatment to be completed quickly, an injection molding composition, and a method for the production of a sintered member are disclosed. The powder injection molding binder contains a polymer (I) which is obtained by polymerizing a monomer component composed of 50 to 100% by weight of a long side chain-containing monomer and 0 to 50% by weight of other polymerizable monomer. The powder injection molding composition comprises the binder, a binder auxiliary, and a powdery material capable of sintering. The method for the production of a sintered member comprises the steps of injection molding the composition, subjecting the molded mass to a degreasing treatment, and sintering the degreased molded mass.

10 Claims, No Drawings

POWDER INJECTION MOLDING BINDER, POWDER INJECTION MOLDING COMPOSITION AND METHOD FOR PRODUCTION OF SINTERED MEMBER

BACKGROUND OF THE INVENTION

1. Field of the Invention

This invention relates to a powder injection molding binder, a powder injection molding composition, and a method for the production of the sintered member in the production of a sintered member from a powdery material of metal, ceramic, cermet, or the like by the injection molding technique.

2. Description of the Prior Art

It is well known that injection molding is utilized as a method for the formation of complicatedly molded products of ceramic and metallic substances. The injection molding method obtains a sintered member as a product by adding to a powdery material various organic compounds and a thermoplastic resin for the purpose of imparting fluidity to the powdery material, heating and kneading the resultant mixture, injection molding the blend in a prescribed shape, degreasing the molded mass, and sintering the shaped mass.

Generally as a binder component, such low molecular compounds as paraffin wax and carnauba wax are prevalently used. Since these compounds are deficient in viscosity and in fluidity as well, they are not easily kneaded with the powdery material, other binder, or the like in the preparation of a powder injection molding composition. They deserve no designation of thorough formability because they have the problem of entraining such detriments as jetting and weld in the process of injection molding. For this reason, the practice of incorporating a plasticizer in this blend for the sake of adjusting the fluidity of the blend has been generally in vogue. The plasticizer, however, often succumbs to decomposition as at the sprue runner part of the molding device and the powder injection molding composition, therefore, is not easily reclaimed for reuse.

The most important part of a process for the production of a flawless sintered member resides in the step of degreasing. The degreasing method which is currently in popular use is known in two kinds; the thermal decomposition method which comprises heating an injection molded mass thereby melt-flowing, thermally decomposing and gasifying an organic binder contained therein and the solvent extraction method which comprises treating an injection molded mass with an organic solvent thereby expelling an organic binder from the injection molded mass.

According to the degreasing method which removes an organic binder by heating, a desire to defat a molded mass without leaving a defect behind inside the molded mass necessitates the fulfillment of the requirement that the organic binder is not melt-flowed, thermally decomposed and evaporated concentrically in a short span of time. When the melt-flowing the thermal decomposition and the evaporation of the organic binder are concentrated in the short span of time, the interior of the molded mass is exposed to pressure, a cause for such damage as a crack and an expansion. For the purpose of preventing the molded mass from sustaining a crack or an expansion while receiving a degreasing treatment, it is necessary that the degreasing treatment be allowed to proceed slowly enough for the organic binder to be thermally decomposed and evaporated gradually. Particularly when the powdery material is given a decreased particle diameter and an increased specific surface area so as to be thermally fluidified stably in the process of injection molding, the amount of the organic binder to be used therein increases and the heating step in the degreasing process necessitates a device such as for dividing the heating step into a multiplicity of stages. The degreasing treatment, therefore, inevitably consumes a long time. At present, the feasibility of an idea of adding a subliming substance to the binder is being studied. It is likely that the subliming substance in the blend evaporates during the steps of blending and molding. During the molding step, the sprue runner part is not easily regenerated.

Then, in the case of the method which expels the organic binder from the injection molded mass by the use of an organic solvent, the component of the organic binder which is soluble in the solvent is dissolved out of the molded mass by the solvent and the portions of the organic binder consequently removed form passageways, with the result that the rest of the organic binder will be thermally decomposed and evaporated smoothly. The molded mass, therefore, sustains such damage as a crack or an expansion with great difficulty during the degreasing step. Since the solvent extraction method which is currently prevalent uses a large amount of such a liquid raw material as mineral oil, fatty acid type oil, or natural oil as an organic binder, the injection molded mass often entrains exudation of the oil therefrom. Even during the protracted storage of the raw materials prepared for the production of the injection molded mass, the exudation of the oil disrupts the stability of storage of the raw materials. When the injection molded mass is stored for a long time, it often happens that the oil which has exuded to the surface induces the molded mass to sustain a crack or an expansion during the steps of extraction and degreasing.

An invention which contemplates using a water-soluble resin as a binder and extracting this water-soluble resin from the molded mass by the use of water is disclosed in JP-A-02-101,101, for example. Owing to the use of water for degreasing, this invention is at an advantage in attaining the degreasing treatment less expensively and more safely. The water nevertheless has the drawback of exhibiting poor penetrating power to the injection molded mass and attaining slow evaporation therefrom as compared with a solvent. Particularly when a cermet powder having a specific surface area of about 10 $m^2/g$ and requiring use of a large amount of an organic binder is used, the drying treatment to be performed after the extracting treatment consumes a long time. When the water which has permeated the molded mass deeply to the core is to be removed by heating, the molded mass possibly sustains a crack or an expansion as the temperature of heating is elevated. Since water is used for degreasing the molded mass, the powder of iron, copper, or the like which gathers rust on contact with water cannot be used for the invention under consideration. Then, the ceramic substance such as, for example, $Si_3N_4$ has the problem of emitting ammonia gas on reacting with water and, therefore, imposing a limit on the raw materials to be used for the production of a molded article.

An object of this invention, therefore, is to provide a novel powder injection molding binder, a powder injection molding composition, and a method for the production of a sintered member.

Another object of this invention is to provide an injection molding binder which exhibits a highly desirable kneading property during the manufacture of a powder injection molding composition even in the absence of a plasticizer and avoids incurring such detriments as jetting or weld during the injection molding and an injection molding composition.

Still another object of this invention is to provide an injection molding binder which permits formation of a molded article incapable of sustaining such defects as a crack or an expansion at the degreasing step and allows the degreasing treatment to be completed quickly, an injection molding composition, and a method for the production of a sintered member.

A further object of this invention is to provide an injection molding composition which allows formation of a stable injection molded article incurring no exudation of oil therefrom even during a protracted storage.

SUMMARY OF THE INVENTION

The various objects mentioned above are accomplished by a powder injection molding binder containing a polymer (I) obtained by polymerizable a monomer component comprising 50 to 100% by weight of at least one long side chain-containing monomer selected from the group consisting of long side chain-containing vinyl monomers represented by the formula I:

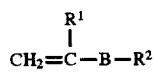  (I)

wherein $R^1$ is H or $CH_3$, $R^2$ is an aliphatic hydrocarbon group having from 15 to 30 carbon atoms, and B is

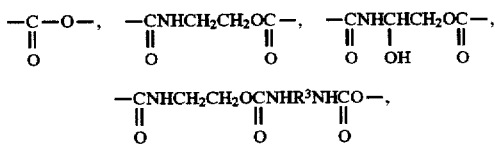

wherein $R^3$ is a divalent organic group, or

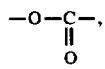

and long side chain-containing maleic monomers represented by the formula II:

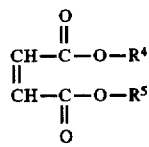  (II)

wherein $R^4$ and $R^5$ are independently H or an aliphatic hydrocarbon group having from 1 to 30 carbon atoms, providing at least either of $R^4$ and $R^5$ is an aliphatic hydrocarbon group having from 15 to 30 carbon atoms, and from 50 to 0% by weight of other polymerizable monomer.

The objects are also accomplished by a powder injection molding composition comprising (a) from 20 to 80% by volume of a powdery material capable of sintering, (b) from 10 to 70% by volume of a polymer (I) obtained by polymerizing a monomer component comprising from 50 to 100% by weight of at least one long chain-containing monomer selected from the group consisting of long side chain-containing vinyl monomers represented by the formula I and long side chain-containing maleic monomers represented by the formula II and from 50 to 0% by weight of other polymerizable monomer, and (c) from 10 to 70% by volume of a binder auxiliary (II) (providing the total of the powdery material, the polymer (I), and the binder auxiliary (II) accounts for 100% by volume).

The objects are further accomplished by a powder injection molding composition comprising a powdery material capable of sintering, from 10 to 90% by weight of the polymer (I), and from 90 to 10% by weight of the binder auxiliary (II).

The objects are further accomplished by a method for the production of a sintered member, comprising the steps of subjecting the powder injection molding composition mentioned above to an injection molding treatment thereby obtaining a molded mass, subjecting the resultant molded mass to a degreasing treatment thereby extracting the binder component from the molded mass, and further subjecting the defatted shaped mass to a sintering treatment.

The objects are further accomplished by a method for the production of a sintered member, comprising the steps of subjecting a powder injection molding composition comprising a powdery material capable of sintering, from 10 to 90% by weight of the polymer (I), and from 90 to 10% by weight of the binder auxiliary (II) to an injection molding treatment, subjecting the resultant molded mass to a degreasing treatment, and further subjecting the defatted shaped mass to a sintering treatment.

The powder injection molding binder of this invention allows a powdery material capable of sintering to be injection molded with high formability and imparts a highly desirable degreasing property to the injection molded mass. The effects of the powder injection molding binder will be more specifically enumerated below.

Since the binder has highly desirable affinity for metals, ceramics, and cermets, it uniformly permeates the powdery material at the step of kneading.

Since the binder has highly desirable viscosity, the blended mass exhibits highly desirable fluidity at the step of injection molding even in the absence of a plasticizer.

Since the binder obviates the necessity for using a plasticizer as an additive, it imparts an excellent recycling property to the powder injection molding composition.

Since the binder possesses viscosity and molecular weight in a fine state of balance, the blended mass does not incur such defects as jetting and weld during the injection molding treatment.

Since the binder shows markedly high solubility to an organic solvent, the injection molded mass is defatted quickly to an ideal extent at the degreasing treatment using an organic solvent. Further, the solvent neither swells the shaped mass nor consequently disintegrates it at the degreasing step.

Owing to these features, sintered members having highly complicated shapes including thin-wall shapes can be produced efficiently even on a quantity basis.

EXPLANATION OF THE PREFERRED EMBODIMENT

The aforementioned polymer (I) which is an essential component for the construction of the powder injection molding binder of this invention is obtained by polymerizing a monomer component comprising from 50 to 100% by weight, preferably from 80 to 100% by weight, of at least one long side chain-containing monomer (A) selected from the group consisting of long side chain-containing monomers (A-1) and (A-2) represented respectively by the formulas I and II mentioned above and from 50 to 0% by weight, preferably from 20 to 0% by weight, of other polymerizable monomer (B) (providing the total of the long chain-containing monomer (A) and the other monomer (B) accounts for 100% by weight). If the amount of the long side chain-containing monomer (A) is less than the lower limit of the range mentioned above, the powder injection molding binder will suffer degradation of crystallinity and solubility and consume unduly long time at the degreasing step. In the monomer component, when the total amount of the long side chain-containing monomers (A) represented by the formula I and the formula II is not less than 50% by weight and less than 100% by weight, the polymerizable monomer (B) other than long side chain-containing vinyl monomers (A-1) and long side chain-containing maleic monomers (A-2) which will be specifically described hereinbelow accounts for the rest of the monomer component.

When a long side chain-containing maleic monomer (A-2) is used as the long side chain-containing monomer (A), the amount of the long side chain-containing maleic monomer is preferable to be in the range of from 50 to 80% by weight, preferably from 50 to 60% by weight and the rest of the monomer component is preferable to be a long side chain-containing vinyl monomer (A-1) and/or other monomer (B) [providing the amount of the other monomer (B) is in the range of from 50 to 0% by weight, preferably from 20 to 0% by weight. As the long side chain-containing monomer (A), the long side chain-containing vinyl monomer (A-1) is preferably 30 to 50% by weight].

The melt viscosity of the polymer (I) at 80° to 180° C. is preferable to be in the range of from 50 to 7000 cps, preferably from 500 to 3000 cps. If the melt viscosity is less than 50 cps, the blend will incur jetting at the injection molding step. If it exceeds 7000 cps, the possibility arises that the wetting property of the powdery material will be lowered and the strength of the sintered member will be decreased, the workability of the blend at the injection molding step will be impaired, the molded mass will sustain a crack or an expansion at the degreasing step, and the degreasing treatment will consume an unduly long time. The softening temperature of the polymer (I) is preferable to be in the range of from 30° to 100° C., preferably from 40° to 60° C. If this temperature is less than 30° C., the molded mass will be disintegrated at the degreasing step. If it exceeds 100° C., the molded mass will sustain a crack or an expansion and the degreasing treatment will consume an unduly long time. The weight average molecular weight of the polymer (I) is desired to be in the range of from 1,000 to 500,000, preferably from 10,000 to 70,000. If this molecular weight deviates from the range mentioned above, the molded mass will sustain a crack or an expansion and the degreasing treatment will consume an unduly long time.

Now, the method for producing the polymer (I) to be used in this invention will be described. This polymer is obtained by polymerizing a monomer component comprising 50 to 100% weight of at least one long side chain-containing monomer selected from the group consisting of long side chain-containing vinyl monomers represented by the formula I:

$$CH_2=\underset{\underset{R^2}{|}}{\overset{R^1}{\underset{|}{C}}}-B-R^2 \quad (I)$$

wherein $R^1$ is H or $CH_3$, preferably H, $R^2$ is an aliphatic hydrocarbon group having from 15 to 30 carbon atoms, and B is

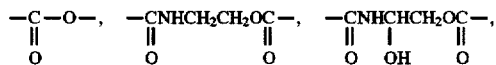

-continued

wherein $R^3$ is a divalent organic group, or

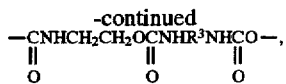

and long side chain-containing maleic monomers represented by the formula II:

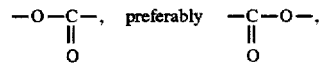

wherein $R^4$ and $R^5$ are independently H or an aliphatic hydrocarbon group having from 1 to 30 carbon atoms, preferably an aliphatic hydrocarbon group having from 15 to 30 carbon atoms, providing at least either, preferably both, of $R^4$ and $R^5$ are an aliphatic hydrocarbon group having from 15 to 30 carbon atoms, and from 50 to 0% by weight of other polymerizable monomer.

The polymerization can be carried out in the form of radical polymerization, ionic polymerization, or the like. As respects the method of polymerization, all the polymerization methods such as bulk polymerization, solution polymerization, emulsion polymerization, and suspension polymerization can be adopted. The polymer (I) is obtained in the form of a solution or a solid having the polymer (I) dissolved therein, a suspension liquid having solid particles of the polymer (I) dispersed in a medium, or an emulsion having solution particles of the polymer (I) dispersed in a medium. The polymer (I) is obtained in a solid state by removing the unaltered monomer and the solvent and other volatile components from the reaction mixtures mentioned above. The polymer (I) can be manufactured in all forms such as block, graft, and random polymerization.

As typical examples of the long side chain-containing vinyl type monomer (A-1), higher alkyl esters of (meth) acrylic acids which are the esters of (meth)acrylic acids with higher alcohols of from 15 to 30 carbon atoms such as stearyl (meth)acrylates, behenyl (meth)acrylates, n-pentadecyl (meth)acrylates, palmityl (meth)acrylates, n-nonadecyl (meth)acrylates, eicosyl (meth)-acrylates, ceryl (meth)acrylates, oleyl (meth)acrylates, and eicosenyl (meth) acrylates; adducts of such monobasic straight chain fatty acids as stearic acid with such polymerizing monomers as glycidyl (meth)acrylates and isopropenyl oxazoline which are capable of addition reaction with a carboxyl group; adducts of such higher alcohols as stearyl alcohol and oleyl alcohol with polyisocyanate compounds and such hydroxyl group-containing polymerizing monomers as hydroxyethyl (meth)acrylates; and such vinyl esters of higher fatty acids as vinyl stearate may be cited.

As typical examples of the long side chain-containing maleic acid type monomer (A-2), such higher alkyl maleates as mono-stearyl maleate, monobehenyl maleate, mono-n-pentadecyl maleate, monopalmityl maleate, mono-n-nonadecyl maleate, monoeicosyl maleate, monoceryl maleate, monooleyl maleate, monoeicosenyl maleate, distearyl maleate, dibehenyl maleate, di-n-pentadecyl maleate, dipalmityl maleate, di-n-nonadecyl maleate, dieicosyl maleate, diceryl maleate, dioleyl maleate, and dieicosenyl maleate; and such higher alkyl fumarates as monostearyl fumarate, monobehenyl fumarate, monopalmityl fumarate, monoeicosyl fumarate, monopalmityl fumarate, monoeicosyl fumarate, monoceryl fumarate, monooleyl fumarate, monoeicosenyl fumarate, distearyl fumarate, dibehenyl fumarate, dipalmityl fumarate, dieicosyl fumarate, dipalmityl fumarate, dieicosyl fumarate, diceryl fumarate, dioleyl fumarate, and dieicosenyl fumarate may be cited.

The polymerizable monomer (B) other than the long side chain-containing vinyl monomer (A-1) and the long side chain-containing maleic monomer (A-2) to be used for the synthesis of the polymer (I) has no particular restriction. Such styrene derivatives as styrene, vinyl toluene, α-methyl styrene, and chloromethyl styrene; such (meth)acrylic esters as methyl (meth)acrylates, ethyl (meth)acrylates, butyl (meth)acrylates, dodecyl (meth)acrylates, and 2-ethylhexyl (meth)acrylates which are synthesized by the esterification of (meth)acrylic acids with monoalcohols of 1 to 14 carbon atoms; such unsaturated carboxylic acids as (meth)acrylic acids, crotonic acid, maleic acid, fumaric acid, and itaconic acid, or half esters thereof, or salts thereof; such (meth) acrylamide derivatives as (meth)acryl amides, N-monomethyl (meth)acryl amides, N-monoethyl (meth) acryl amides, N,N-dimethyl (meth)acryl amides, N-methylol (meth)acryl amides, and N-butoxymethyl (meth)acryl amides, salts thereof, and quaternary compounds thereof; such hydroxyl group-containing unsaturated monomers as 2-hydroxyethyl (meth)acrylates, 2-hydroxypropyl (meth)acrylates, and monoesters of (meth) acrylic acids with polypropylene glycol or polyethylene glycol; such sulfonic acid group-containing unsaturated monomers as ethyl (meth)acrylic acid-2-sulfonates, vinyl sulfonic acid, styrene sulfonic acid, and salts thereof; such basic unsaturated monomers as dimethylaminoethyl (meth) acrylates, dimethylaminoethyl (meth)-acryl amides, dimethylaminopropyl (meth)acryl amides, vinyl pyridine, vinyl imidazole, and vinyl pyrrolidone; such polyfunctional (meth)acrylic esters as esters of (meth)acrylic acids with such polyhydric alcohols as ethylene glycol, 1,3-butylene glycol, diethylene glycol, 1,6-hexane glycol, neopentyl glycol, polyethylene glycol, polypropylene glycol, trimethylol propane, pentaerythritol, and dipentaerythritol which have at least two polymerizing unsaturated groups in the molecular units thereof; such organic silicon group-containing unsaturated monomers as vinyl trimethoxy silane, γ-(meth)acryloylpropyl trimethoxy silane, allyl triethoxy silane, and trimethoxysilyl-propylallyl amine; such oxazoline group-containing polymerizing monomers as 2-isopropenyl-2-oxazoline and 2-vinyl oxazoline; such epoxy group-containing polymerizing monomers as glycidyl (meth)-acrylates and acrylglycidyl ether; such halogenated unsaturated monomers as vinyl fluoride, vinylidene fluoride, vinyl chloride, and vinylidene chloride; such halohydrin group-containing unsaturated monomers as 2-hydroxy-3-chloropropylene (meth)acrylates; such aziridinyl group-containing polymerizing monomers as 2-aziridinylethyl (meth)acrylates; such blocked isocyanate group-containing unsaturated monomers as reaction adduts of 2-isocyanate ethyl (meth)acrylate with ethyl alcohols; such unsaturated monomers as divinyl benzene and diallyl phthalate which have two ethylenically unsaturated groups; such vinyl esters of saturated carboylic acids as vinyl acetate; (meth)-acrylonitriles; and acrolein, for example, are usable. These polymerizing monomers may be used either singly or in the form of a mixture of two or more members.

For the synthesis of the polymer (I), the method of radical polymerization using a radical polymerization initiator is adopted desirably. Any of the well-known radical polymerization initiators of both the oil-soluble and the water-soluble type can be used. As typical examples of the oil-soluble initiator, such azo compounds as azo-bis-isobutyronitrile, azo-bis-valeronitrile, $2,2^1$-azo-bis-(2,4-dimethyl valeronitrile), 1,1'-azo-bis-(cyclo-hexane-1-carbonitrile), 2,2'-azo-bis-(2-aminopropane) dihydrochloride, and 4,4'-azo-bis-(4-cyanopentanoic acid); and such organic peroxides as benzoyl peroxide, cumene hydroperoxide, di-t-butyl peroxide, t-butyl hydroperoxide, and t-butyl peroxy-2-ethylhexanolate may be cited. As typical examples of the water-soluble initiator, potassium persulfate, ammonium persulfate, and hydrogen peroxide may be cited. For the purpose of heightening the rate of polymerization, an oxidizing agent type polymerization initiator may be used, when necessary, as combined with a reducing agent so as to function as a redox type initiator. The amount of the polymerization initiator to be used is in the range of from 0.01 to 5 parts by weight, preferably from 0.5 to 2 parts by weight, based on 100 parts by weight of the polymerizing monomer component. The addition of the radical polymerization initiator can be made at a suitable time as in the standard radical polymerization. For the radical polymerization of the polymerizing monomer component, any of the polymerization apparatuses heretofore known in the art may be adopted. The polymerization temperature is in the range of from 0° to 200° C., preferably from 50° to 150° C. The polymerization time is in the range of from 1 to 15 hours, preferably from 3 to 8 hours.

The powder injection molding binder of this invention is obtained by mixing the polymer (I) mentioned above with such binder auxiliaries (II) as binding agent, plasticizer, and slip additive, for example.

The binder auxiliary (II) is composed of binding agent, plasticizer, slip additive, or the like which are generally used for powder injection molding. As concrete examples of the binding agent, polyethylene, polypropylene, polybutene, poly-styrene, ethylene-vinyl acetate copolymer, cellulose acetate, polybutyl methacrylate, acrylic resins excepting the polymer (I), polyvinyl alcohol, carboxymethyl cellulose, glucose, methyl cellulose, starch, dextrin, molasses, gelatin, spent liquor, peptone, polyvinyl ether, ethyl cellulose, acetyl cellulose, wax, liquid paraffin, heavy oil, machine oil, phenol resin, ethyl silicate, polyacetal, and nylon type resins may be cited. These binding agents may be used singly or in the form of a mixture of two or more members. As typical examples of the slip additive, such waxes as paraffin wax, microcrystalline wax, urethanated wax, and Fischer-Tropsch wax, such higher fatty acids as polyethylene glycol and stearic acid, such metallic salts of higher fatty acid as aluminum stearate and magnesium stearate, such higher fatty acid esters as diglycol stearate, flour, and mineral oil may be cited. These slip additives may be used singly or in the form of a mixture of two or more members.

As typical examples of the plasticizer, such aliphatic diesters as diethyl phthalate, dibutyl phthalate, and dioctyl phthalate and aliphatic monoesters may be cited. These plasticizers may be used singly or in the form of a mixture of two or more members. Generally, the binder auxiliary (II) incorporates one species of binding agent and one species of slip additive and, where the powder injection molding composition does not need to be recycled, optionally incorporates additionally a plasticizer. The powder injection molding binder of this invention can be produced by mixing the polymer (I) with the binder auxiliary (II). The mixing ratio in this case is desired to be 10 to 90% by weight of the polymer (I) to 90 to 10% by weight of the binder auxiliary (II), preferably 30 to 80% by weight of the polymer (I) to 70 to 20% by weight of the binder auxiliary (II).

The method for mixing the polymer (I) with the binder auxiliary (II) has no particular restriction. Any of the mixing methods heretofore known to the art may be adopted. They may be mixed by the use of a kneader at a temperature in the range of from 80° to 200° C., preferably from 100° to 170° C., for a period in the range of from 0.5 to 3 hours, preferably from 0.5 to 1 hour.

The powder injection molding composition of this invention is composed of a powdery material capable of sintering and the powder injection molding binder mentioned above. To be more specific, it is composed of the powdery material capable of sintering, the polymer (I), and the binding auxiliary (II).

Preferably, an amount of the powdery material capable of sintering is in the range of from 20 to 80% by volume, that of the polymer (I) in the range of from 10 to 70% by volume, and that of the binder auxiliary (II) in the range of from 10 to 70% by volume. Preferably, the amount of the powdery material capable of sintering is in the range of from 40 to 70% by volume, that of the polymer (I) in the range of from 10 to 50% by volume, and that of the binder auxiliary (II) in the range of from 10 to 50% by volume. The total of the amounts of the powdery material, the polymer (I), and the binder auxiliary (II) is 100% by volume.

The method for mixing the powdery material capable of sintering, the polymer (I), and the binder auxiliary (II) in the production of the powder injection molding composition of this invention has no particular restriction. Any of the mixing methods well known in the art may be adopted. They may be mixed by the use of a kneader at a temperature in the range of from 80° to 200° C., preferably from 100° to 170° C., for a period in the range of from 0.5 to 3 hours, preferably from 0.5 to 1 hours. It is permissible to adopt instead the method which comprises mixing the polymer (I) with the binder auxiliary (II) to prepare an injection molding binder and mixing this binder with the powdery material capable of sintering prior to use or the method which comprises mixing the powdery material capable of sintering with the polymer (I) and the binder auxiliary (II) prior to use.

The powder injection molding composition of this invention, when necessary, may be pulverized into pellets of a varying particle diameter to be desired.

As typical examples of the powdery material capable of sintering and usable in this invention, such metal powder as metallic silicon powder, iron or iron alloy powder such as high speed steel, super alloy powder such as titanium, tungsten or boron-containing alloy, and such ceramics powder as silicon nitride powder, silicon carbide powder, alumina powder, zirconia powder, sialon powder(silicon-nitride-alumina) may be cited. Further, cermet powder which is a mixture of metal powder and ceramics powder may be used, and if necessary, at least one kind of metal powder and ceramics powder may be used. The average particle diameter of the powdery material is in the range of from 0.01 to 1.000 µm, preferably from 0.1 to 20 µm.

Now, the method of this invention for producing a sintered member from the powdery material will be described hereinbelow. The sintered member is obtained by injection molding the powder injection molding composition of this invention thereby obtaining a molded mass, then subjecting the molded mass to a degreasing treatment thereby expelling the binder component from the molded mass, and sintering the defatted molded mass.

The method for effecting the injection molding is not specifically limited. Any of the injection molding methods well known in the art may be adopted. The injection molding can be carried out at a temperature in the range of from 80° to 200° C., preferably from 160° to 180° C., under a pressure in the range of from 300 to 2,500 kg/cm$^2$, preferably from 600 to 1,000 kg/cm$^2$, for example.

At the degreasing step, the powder injection molding binder is removed. The degreasing treatment is effected by the use of a solvent or by the application of heat. In this invention, the procedure which comprises first degreasing the blended mass with a solvent thereby removing the greater part of the polymer (I) and part of the binder auxiliary (II) and then heating the defatted mass thereby removing the residual organic substances proves particularly preferable. As typical examples of the organic solvent to be used at the degreasing step, chlorine-containing solvents as methylene chloride, dichloroethane, trichloroethane, and carbon tetrachloride; aromatic solvents such as benzene, toluene, and xylene; aliphatic type solvents such as hexane, heptane, cyclohexane, decalin, tetralin, and petroleum ether; alcohol type solvents such as methanol, ethanol, propanol, butanol, hexanol, butyl cellosolve, and butyl carbitol; ketone type solvents such as acetone and methylethyl ketone; nitrogen containing type solvents such as dimethyl formamide, nitromethane and acetonitrile; ester type solvents such as ethyl acetate and butyl acetate; sulfur-containing type solvents such as dimethyl sulfoxide and carbon disulfide; and complex type solvents such as ethanol amine may be cited. These solvents may be used singly or in the form of a mixture of two or more members.

The degreasing treatment is preferable to be carried out at a temperature in the range of from 20° to 80° C. for a period in the range of from 10 to 360 minutes, preferably at a temperature in the range of from 20° to 40° C. for a period in the range of from 30 to 180 minutes. If necessary, stirring the solvent may promote the degreasing. The degreasing treatment by the use of the solvent is preferable to remove from 70 to 90% of the powder injection molding binder of this invention. Then, the residual binder is removed by heating in a degreasing furnace under an atmosphere of normal pressure, decreased pressure, or vacuum. The conditions for this degreasing treatment are not particularly limited. The treatment may be carried out under an atmosphere of nitrogen gas at a temperature increasing rate of 30° to 100° C. per hour from room temperature to 500° C.

The sintered member aimed at by this invention is obtained by sintering the molded mass which results from the degreasing treatment. The conditions for the sintering treatment may be those which are generally adopted for any sintering process. For example, the sintering treatment is accomplished by holding the shaped mass under a vacuum or in an atmosphere of inert gas at 1300° C. for 2 hours.

Now, working examples of this invention and controls will be cited below. It should be noted that this invention is not limited to the working examples.

REFERENTIAL EXAMPLE 1

In a flask provided with a dropping funnel, a stirrer, a nitrogen inlet tube, a thermometer, and a condenser, 100 parts of toluene was gently stirred and heated to 80° C. as swept with nitrogen gas. Then, a polymerizing monomer solution prepared in advance by mixing 100 parts of stearyl acrylate with 200 parts of toluene and 1 part of 2,2'-azo-bis-isobutyronitrile was added dropwise through the dropping funnel to the heated toluene over a period of 2 hours and left polymerizing therein at 80° C. After the dropwise addition was completed, the reaction solution was kept at the same temperature for 1 hour and then left aging in a refluxed state for 2 hours. Consequently, a toluene solution having a solids content of 25.2% was obtained. When this solution was analyzed by gas chromatography, no residual monomer was detected. This fact indicates that the conversion was 100%. This solution was heated under a reduced pressure to expel toluene and obtain a white solid compound (a-1) having a weight average molecular weight of 6,000.

REFERENTIAL EXAMPLE 2

In the same flask as used in Referential Example 1, 33 parts of toluene was gently stirred and heated to 80° C. as swept with nitrogen gas. Then, a polymerizable monomer solution prepared in advance by mixing 100 parts of stearyl methacrylate with 33 parts of toluene and 0.4 part of 2,2'-azo-bis-isobutyronitrile was added dropwise through the dropping funnel into the heated toluene over a period of 2 hours and left polymerizing therein at 8° C. After the dropwise addition was completed, the reaction solution was kept at the same temperature for 1 hour and then left aging in a refluxed state for 2 hours. Consequently, a toluene solution having a solids content of 60.0% was obtained. When this solution was analyzed, the conversion was found to be 100%. This solution was heated under a reduced pressure to expel toluene and obtain a white solid compound (a-2) having a weight average molecular weight of 47,000.

REFERENTIAL EXAMPLE 3

In the same flask as used in Referential Example 1, 33 parts of toluene was gently stirred and heated to 80° C. as swept with nitrogen gas. Then, a polymerizable monomer solution prepared in advance by mixing 80 parts of stearyl acrylate with 15 parts of behenyl acrylate, 5 parts of styrene, 33 parts of toluene, and 0.4 part of 2,2'-azo-bis-isobutyronitrile was added dropwise through the dropping funnel into the heated toluene over a period of 2 hours and left polymerizing therein at 80° C. After the dropwise addition was completed, the reaction solution was kept at the same temperature for 1 hour and then left aging in a refluxed state for 2 hours. Consequently, a toluene solution having a solids content of 60.2% was obtained. When this solution was analyzed, the conversion was found to be 100%. This solution was heated under a reduced pressure to expel toluene and obtain a white solid compound (a-3) having a weight average molecular weight of 50,000.

REFERENTIAL EXAMPLE 4

In the same flask as used in Referential Example 1, 33 parts of toluene was gently stirred and heated to 80° C. as swept with nitrogen gas. Then, a polymerizable monomer solution prepared in advance by mixing 80 parts of stearyl acrylate with 15 parts of stearyl maleate, 5 parts of styrene, 33 parts of toluene, and 0.4 part of 2,2'-azo-bis-isobutyronitrile was added dropwise through the dropping funnel into the heated toluene over a period of 2 hours and left polymerizing therein at 80° C. After the dropwise addition was completed, the reaction solution was kept at the same temperature for 1 hour and then left aging in a refluxed state for 2 hours. Consequently, a toluene solution having a solids content of 60.0% was obtained. When this solution was analyzed, the conversion was found to be 100%. This solution was heated under a reduced pressure to expel toluene and obtain a white solid compound (a-4) having a weight average molecular weight of 42,000.

COMPARATIVE REFERENTIAL EXAMPLE 1

In the same flask as used in Referential Example 1, 33 parts of toluene was gently stirred and heated to 80° C. as swept with nitrogen gas. Then, a polymerizable monomer solution prepared in advance by mixing 40 parts of stearyl acrylate with 60 parts of styrene, 33 parts of toluene, and 0.4 part of 2,2'-azo-bis-isobutyronitrile was added dropwise through the dropping funnel into the heated toluene over a period of 2 hours and left polymerizing therein at 80° C. After the dropwise addition was completed, the reaction solution was left aging at the same temperature for 1 hour and then combined with an initiator solution composed of 0.2 part of 2,2'-azo-bis-isobutyronitrile and 4 parts of toluene. Then, the resultant mixture was left aging under a refluxed state for 2 hours. Consequently, a toluene solution having a solids content of 60.0% was obtained. When this solution was analyzed, it was found to contain 0.4% of styrene. This fact indicates that the conversion was 99.6%. This solution was heated under a reduced pressure to expel toluene and obtain a white solid compound (b-1) having a weight average molecular weight of 68,000.

EXAMPLES 1 AND 2

Powder injection molding binders (1) and (2) were obtained by kneading the following sets of components at 140° C. for 40 minutes.

Powder injection molding binder (1)
  30 parts by weight of compound (a-1), 40 parts by weight of polypropylene, and 30 parts by weight of paraffin wax.

Powder injection molding binder (2)
  30 parts by weight of compound (a-2), 30 parts by weight of polyethylene, and 20 parts by weight of paraffin wax.

EXAMPLES 3 THROUGH 6

Powder injection molding compositions (1) and (4) were obtained by kneading the following sets of components by the use of a pressure kneader at 140° C. for 40 minutes, extracting the mixtures from the kneader, and pulverizing the mixtures.

Powder injection molding composition (1)
  60% by volume of powdered stainless steel (a) and 40% by volume of powder injection molding binder (1).

Powder injection molding composition (2)
  55% by volume of iron-nickel 36% powder and 45% by volume of powder injection molding binder (2).

Powder injection molding composition (3)
  50% by volume of nitrogenated silicon, 18% by volume of polyethylene, 18% by volume of paraffin wax, and 14% by volume of compound (a-3).

Powder injection molding composition (4)
  50% by volume of powdered stainless steel (b), 18% by volume of polypropylene, 14% by volume of paraffin wax, and 18% by volume of compound (a-4).

Note) Powdered stainless steel (a): Product of Mitsubishi Steel Mfg. Co., Ltd. (average particle diameter 6 µm).

Iron-nickel 36% powder: Product of Taiheiyo Metal Co., Ltd. (average particle diameter 10 µm).

Nitrogenated silicon powder: Product of Ube Industries, Co., Ltd. (average particle diameter 0.5 µm).

Polyethylene: Product of Tokuyama Soda Co., Ltd., PN-670.

Paraffin wax: Product of Nippon Seiro Co., Ltd., SP0145.

Powdered stainless steel (b): Product of Taiheiyo Metal Co., Ltd. (average particle diameter 8 µm).

Polypropylene: Product of Tokuyama Soda Co., Ltd., PN670.

Controls 1 through 3

Powder injection molding compositions for comparison (1) through (3) were obtained by kneading the following sets of component by the use of a pressure kneader at 140° C. for 40 minutes, extracting the resultant mixtures from the kneader, and pulverizing the mixtures.

Powder injection molding composition for comparison (1)

50% by volume of powdered stainless steel (b), 18% by volume of polypropylene, 14% by volume of paraffin wax, and 18% by volume of compound (b-1).

Powder injection molding composition for comparison (2)

50% by volume of nitrogenated silicon, 18% by volume of polyethylene, 18% by weight of paraffin wax, and 14% by volume of carnauba wax.

Powder injection molding composition for comparison (3)

50% by volume of powdered stainless steel (b), 18% by volume of polypropylene, 14% by volume of paraffin wax, and 18% by volume of peanut oil.

Note) Peanut oil: Product of Nakaraichisuku (reagent). Carnauba wax: Product of Kishida Chemical (reagent).

EXAMPLE 7

Samples of the powder injection molding compositions (1) through (4) obtained in Examples 3 through 6 were each injection molded at a molding temperature of 150° C. under an injection pressure of 1800 kg/cm$^2$ to obtain molded pieces (1) through (4) 4 mm in thickness, 10 mm in width, and 50 mm in length. These molded pieces were stored at room temperature for 7 days and visually examined. Then, the molded pieces were kept immersed in 50 ml of xylene or decalin for 180 minutes and then dried to obtain extracted shaped pieces (1) through (4). The extracts were analyzed to define the ratios of extraction of binder. The results are shown in Table 1. The ratio of extraction was calculated in accordance with the formula: Ratio of extraction=(Weight of extracted binder)÷(Total weight of binder). It has been demonstrated that the molded pieces using the powder injection molding binder and the powder injection molding composition according to this invention did not sustain such damage as a crack or an expansion at the degreasing step and produces high ratios of extraction.

TABLE 1

|  | Appearance after 7 days' standing | Ratio of extraction (%) | |
| --- | --- | --- | --- |
|  |  | Xylene | Decalin |
| Molded piece (1) | No abnormal sign observed | 35 | 32 |
| Molded piece (2) | No abnormal sign observed | 32 | 31 |
| Molded piece (3) | No abnormal sign observed | 34 | 32 |
| Molded piece (4) | No abnormal sign observed | 33 | 32 |

Control 4

Samples of the powder injection molding compositions for comparison (1) through (3) obtained in Control 1 through 3 were each injection molded to obtain molded pieces for comparison (1) through (3) by the procedure of Example 7.

The molded pieces for comparison (1) through (3) were tested for ratio of extraction by following the procedure of Example 7. The results are shown in Table 2. The molded pieces for comparison (1) and (2) were found to show low ratios of extraction and sustain damage due to a crack or expansion. The molded piece for comparison (3), after 7 days' standing at room temperature, showed a sign of oil exudation on the surface.

TABLE 2

|  | Appearance after 7 days' standing | Ratio of extraction (%) | |
| --- | --- | --- | --- |
|  |  | Xylene | Decalin |
| Molded piece for comparison (1) | No abnormal | Rupture | 8 |
| Molded piece for comparison (2) | No abnormal | 10 | 5 |
| Molded piece for comparison (3) | Exudation of oil observed | 35 | 30 |

EXAMPLE 8

The extracted shaped pieces (1) through (4) obtained in Example 7 were sintered in the air at 320° C. to obtain sintered members (1) through (4). The sintered members were tested for relative density. The results are shown in Table 3. The relative density was calculated in accordance with the formula: Relative density=(Found density)÷(Calculated density). It has been demonstrated that the sintered members obtained from the powder injection molding compositions using the powder injection molding binders of this invention possessed very high degrees of relative density.

TABLE 3

|  | Relative density |
| --- | --- |
| Sintered member (1) | 96.0 |
| Sintered member (2) | 97.2 |
| Sintered member (3) | 98.1 |
| Sintered member (4) | 96.7 |

What is claimed is:

1. A powder injection molding composition comprising (a) from 20 to 80% by volume of a powdery material capable of sintering, (b) from 10 to 70% by volume of an organic solvent soluble polymer (I) obtained by polymerizing a monomer component comprising from 50 to 100% by weight of at least one long side chain-containing monomer selected from the group consisting of (i) long side chain-containing vinyl monomers represented by the formula (1)

wherein $R^1$ is H or $CH_3$, $R^2$ is an aliphatic hydrocarbon group having from 15–30 carbon atoms and B is —C(O)—O—, —C(O)NH.CH$_2$.CH$_2$.O.C(O)—, —C(O)NH.CH(OH).CH$_2$.O.C(O)—, or —C(O)NH.CH$_2$.CH$_2$.O.C(O)NH.R$^3$.NH.C(O)O— wherein $R^3$ is a divalent organic group or —O.C(O)—, and (ii) long side chain-containing maleic monomers represented by the formula (2)

wherein $R^4$ is H or an aliphatic hydrocarbon group having from 15–30 carbon atoms and $R^5$ is an aliphatic hydrocarbon group having from 15–30 carbon atoms, and from 50 to 0% by weight of other polymerizable monomer, and (c) from 10 to 70% by volume of a binder auxiliary (II), providing the total of the powdery material, the polymer (I), and the binder auxiliary (II) accounts for 100% by volume, wherein after said composition is subjected to injection molding, said polymer (I) and said binder auxiliary (II) are removable from said injection molded product, whereby the residual molded product comprising said powdery material is sinterable to provide the desired sintered powdery material, free of said polymer (I) and said binder auxiliary (II).

2. The powder injection molding according to claim 1, wherein said powdery material capable of sintering is the powder of at least one member selected from the group consisting of metals, ceramic substances, and cermets.

3. The powder injection molding according to claim 1, wherein an average particle diameter of said powdery material capable of sintering is in the range of from 0.1 to 20 μm.

4. The powder injection molding according to claim 1, wherein said binder auxiliary (II) is at least one member selected from the group consisting of a binding agent, a plasticizer, and a slip additive.

5. The powder injection molding composition according to claim 1, wherein the amount of said polymer (I) is in the range of from 10 to 50% by volume and the amount of said binder auxiliary (II) is in the range of from 10 to 50% by volume providing the total of said polymer (I) and said binder auxiliary (II) and said powdery material accounts for 100% by volume.

6. The powder injection molding composition according to claim 1, wherein $R^1$ is H, $R^2$ is an aliphatic hydrocarbon group from 15 to 30 carbon atoms, and B is

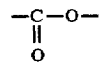

in the formula (1) and $R^4$ is H or an aliphatic hydrocarbon group of from 15 to 30 carbon atoms and $R^5$ is an aliphatic hydrocarbon group of from 1 5 to 30 carbon atoms in the formula (2).

7. The powder injection molding composition according to claim 1, wherein said long side chain-containing monomer is a long side chain-containing vinyl monomer represented by the formula (1).

8. The powder injection molding composition according to claim 7, wherein $R^1$ is H, $R^2$ is an aliphatic hydrocarbon group of from 15 to 30 carbon atoms, and B is

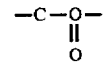

in the formula (1).

9. The powder injection molding composition according to claim 1, wherein the polymer (I) obtained by polymerizing a monomer component comprises 80 to 100% by weight of said long side chain-containing monomer and 20 to 0% by weight of said other polymerizable monomer.

10. The powder injection molding composition according to claim 1, wherein said powdery material is metals.

* * * * *